United States Patent Office 3,433,124
Patented Mar. 18, 1969

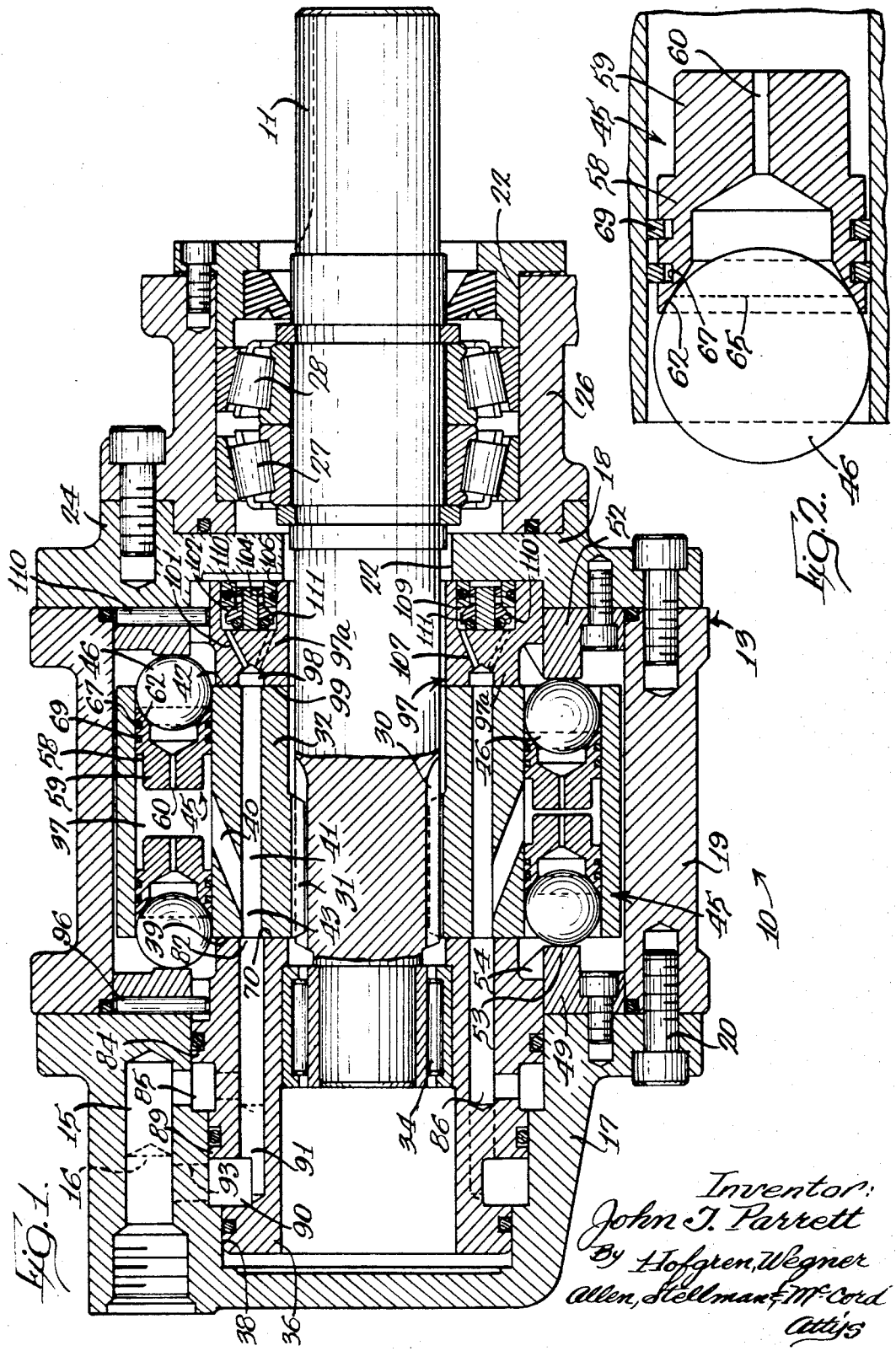

3,433,124
HYDRAULIC MOTOR
John T. Parrett, Benton Harbor, Mich., assignor to Benton Harbor Engineering Works, Incorporated a corporation of Michigan
Filed Oct. 10, 1967, Ser. No. 674,203
U.S. Cl. 91—198    8 Claims
Int. Cl. F01b *13/04;* F04b *1/22*

ABSTRACT OF THE DISCLOSURE

A hydraulic energy translating device of the multiple piston type wherein the pistons comprise spherical balls slidable within cylinders with sealing rings engaging the balls preventing leakage around the balls, there being provided an orifice in each of the sealing rings sized so that if separation occurs between the balls and the associated sealing rings the pressure drop across the orifice will produce a net hydraulic force acting on the sealing rings urging them back into engagement with their associated balls.

Background of the invention

This invention relates generally to hydraulic fluid energy translating devices and more particularly to a hydraulic pump or motor device.

One type of hydraulic fluid energy translating device is an axial piston design in which pistons reciprocate in cylinders disposed parallel to the axis of rotation of the cylinder block. In my prior co-pending application Ser. No. 598,340, filed Dec. 1, 1966, I have disclosed piston assemblies for use in a hydraulic fluid energy translating device of this type.

Briefly, these piston assemblies include spherical balls reciprocable in each of the cylinders with sealing rings on one side of each of the balls preventing the escape of fluid from within the cylinders around the spherical balls. For maintaining sealing engagement between the sealing rings and the spherical balls and engagement between the spherical balls and the cam I provide in my prior arrangement springs which engage the sealing rings and urge them into contact with the spherical balls.

When this type of device operates as a pump the springs serve primarily a piston return function during the intake stroke of the pistons since without the springs the pressure of fluid entering the pump would usually be insufficient to withdraw the pistons toward their bottom dead center positions. When this device operates as a motor the springs serve to reduce noise and vibration by maintaining contact between the sealing rings and the spherical balls and between the balls and the cam.

However, it has been found desirable to eliminate these springs in devices which operate as a motor since the springs reduce the efficiency of the device and are themselves subjected to wear and failure. It has also been found that when the springs are removed from the ball and sealing ring assemblies described above that significant noise develops in the motor believed to be caused either by separation between the sealing ring and the spherical ball and/or between the spherical ball and the cam.

Summary of the invention

In accordance with the present invention the above described problem of noise and vibration in a springless piston assembly arrangement of the type described is eliminated or minimized through the provision of an orifice in the sealing ring communicating with fluid pressure in the cylinders and sized sufficiently small so that a pressure drop is produced across each sealing ring when separated from the spherical balls which causes the sealing rings to be returned to sealing engagement with the spherical members or the spherical members returned to driving engagement with the cam.

While it is difficult to ascertain the exact reason for this noise or vibration it is believed to be caused primarily by a separation between the sealing rings and the spherical members. Without the springs acting on the sealing rings there is after separation no force tending to urge the sealing rings toward the spherical pistons. Of course, the differential areas exposed to fluid pressure on the sealing ring when in engagement with the piston assist in maintaining engagement, but this is effective only so long as the sealing ring is in engagement with the piston and not after they separate.

Following the assumption that the noise and vibration is primarily caused by separation between the sealing rings and the spherical members during certain operational conditions the orifice in the sealing ring is sized so that a net restoring force caused by fluid pressure acts on the sealing ring when separated from the piston, and this force is at least as great as the frictional resistance of the sealing ring against the associated cylinder wall. This assures that when separation has occured the ring will be immediately returned to the spherical member.

The orifice in the sealing rings has the additional function of returning the sealing rings to engagement with the spherical pistons after the motor has free-wheeled. In this context freewheeling may be defined as the state of the motor when driven by an external force without any fluid supplied to the motor so that it does not operate as a pump. Under these conditions the spherical members and the sealing rings will separate with the sealing rings remaining stationary adjacent the top dead center portions of the cylinders even though the cylinder block continues rotation. After fluid under pressure is again supplied to the cylinder it is of course desirable that the rings return to engagement with the spherical members so that they resume their normal function described above. The orifices according to the present invention assure this re-engagement.

According to another feature of the present invention the spherical sealing rings are particularly designed for use in an opposed piston hydraulic unit wherein two piston assemblies are provided in each cylinder. Porting to and from the cylinders is provided by cylinder ports communicating approximately centrally of the cylinder. Since springs are not provided for urging the sealing rings away from the cylinder ports there is a possibility that one of the sealing rings might cover the ports and prevent communication with the cylinder. To prevent this condition projections are provided on the ends of the sealing rings adapted to engage a projection on the opposed sealing ring when the former approaches coverage of the cylinder ports thereby preventing such coverage.

Brief description of the drawing

Other features and advantages of the invention will be apparent from the following description of certain embodiments thereof taken in conjunction with the accompanying drawing. In the drawing:

FIG. 1 is a longitudinal section of a hydraulic energy translating motor according to the present invention, and FIG. 2 is a sub-assembly view of a piston assembly shown in FIG. 1.

Description of the preferred embodiment

Referring now to the drawing and particularly FIGS. 1 and 2 therein, a hydraulic motor 10 is shown having an output shaft 11 connected to drive a suitable load such as the turntable of a mobile crane. Shaft 11 is supported within a housing assembly 13 having inlet and outlet passages 15 and 16 extending therethrough. Either of the passages 15 and 16 may be connected to a suitable source of hydraulic fluid under pressure, such as a pump, and the other connected to return fluid to the source inlet or to a suitable tank (not shown). With hydraulic fluid being supplied to one of the passages the output shaft 11 will be driven in rotation in one direction and if fluid under pressure is delivered to the other passage the shaft 11 will be driven in the reverse direction.

The housing 13 consists of a central annular member 19 with end plates 17 and 18 fixed thereto by suitable threaded fasteners 20. The end plate 18 has a central opening 22 and an annular flange 24 for receiving a bearing support 26. Support 26 receives tapered roller bearings 27 and 28 which support the right end of shaft 11.

Formed on the shaft 11 within housing member 19 are splines 30 which interengage mating splines 31 formed internally on a rotatable cylinder block 32. The inner end of shaft 11 is supported within a needle bearing 34 seated within an annular valve member 36 in turn seated in a stepped bore 38 in end plate 17.

Cylinder block 32 is generally annular in configuration and is supported on the spline portion 31 of shaft 11.

Formed axially in the cylinder block 32 in annular array about the axis of rotation thereof and shaft 11 are a plurality of cylinders 37 extending completely therethrough. Each of the cylinders 37 communicates with a port face 39 at one end of the cylinder block through angled passages 40 and intersecting axial passages 41 which open to face 39. Passages 41 also open to opposite face 42 of the cylinder block 32 for a purpose described in more detail hereinbelow.

It should be understood that there is one passage 40 and one passage 41 for each of the cylinders 37. The intersection of the passages 41 with the port face 39 define a plurality of cylinder ports 43 which are annularly arrayed on the port face 39.

Two piston assemblies 45 are slidably received in each of the cylinders 37, and each includes a spherical ball piston 46. A first annular cam 49 is mounted on the inner end of end cap 17 for reciprocating the pistons 46 in the left ends of the cylinders 37, thus permitting the high pressure fluid in the cylinders 37 to be translated into rotary motion of the cylinder block 32 and output shaft 11. Similarly, an identical cam 52 is mounted on an inward face of end cap or plate 18 for reciprocating the pistons 46 adjacent thereto. The cams 49 and 52 are slightly out of phase with respect to one another to achieve a more uniform flow of hydraulic fluid.

Each of the cams has an upstanding annular cam track 53 defining a plurality of lobes 54 in each of the cam members 49 and 52 so that the pistons 46 reciprocate through a plurality of power strokes during each revolution of the cylinder block 32. In one exemplary construction of the device shown in FIG. 1 twenty cylinders 37 and twelve cam lobes 54 were provided so that for each revolution of the cylinder block 32 each piston 46 has twelve power cycles.

Referring now in more detail to the piston assemblies 45, cylindrical sealing rings 58 are provided adjacent and engaging each piston 46.

As shown more clearly in FIG. 2, the seal rings 58 are seen to be generally cylindrical and slidably received in the cylinders 37 and each have a reduced portion extending inwardly defining a projection 59.

The projections 59 are sufficiently long with respect to the length of the cylinders 37 so that they serve as stops engaging one another when the device is freewheeling and not under pressure preventing the cylinder engaging portions of the sealing rings from covering the passages 40 and preventing, if permitted, the flow of hydraulic fluid under pressure to the cylinders. However, as may be seen by the relationship between the sealing rings in the lower cylinders in FIG. 1, the projections 59 are not so long that they will engage during any portion of the stroke of the piston assemblies when the cylinders are under pressure.

The sealing rings 58 each have an orifice 60 therethrough so that one side of the spherical pistons freely communicates with the interior of the cylinders 37. An outwardly tapered conical portion 62 is formed within the sealing rings having line contact as shown at 65 with the spherical piston thereby sealing any fluid tending to discharge from the cylinders through the orifice 60.

Carried in annular recesses 67 in the periphery of the sealing rings 58 are piston rings 69 which serve to prevent the leakage of hydraulic fluid from within the cylinders 37 around the periphery of the sealing rings 58. The diameter of the spherical pistons 46 is only slightly smaller than the cylinders 37. The sealing rings 58 have a diameter smaller than the diameter of the spherical pistons so that the former do not directly engage the cylinders 37.

When the cylinder block 32 rotates the cam lobes 54 exert forces on the pistons 46 in a tangential direction (in a plane tangent to the cylinder defined by the revolution of the axes of the cylinders 37). This cam force is transmitted from the spherical pistons directly to the cylinder block so that none of the driving load passes through the sealing rings 58. The cam force causes the spherical pistons to have some clearance with the cylinder 37 on one side thereof and this would in the absence of the sealing ring 58, cause leakage around the pistons detracting from the efficiency of the device. This misalignment of pistons 46 causes the sealing rings to be shifted slightly in the cylinders 37 assuring that line contact 65 is maintained and fluid leakage is prevented between the conical portion 62 of the seal rings and the spherical pistons. The piston rings 69 however remain centered in the cylinders 37 and by engagement with the sides of the recesses 67 prevent leakage around the rings 58. The axial location of line contact 65 is selected with respect to the spherical pistons 46, to expose a sufficient area of each piston to fluid pressure in the cylinder 37 so that the hydraulic force on the piston, as distinct from the mechanical force transmitted to the piston by the line of contact 65, is large enough to assure proper rolling contact of the spherical pistons on the cam tracks 53.

The proper sizing of the orifice 60 assures continuous sealing engagement between ring 58 and piston 46 and between piston 46 and cam track 53 when the device is operating as a motor. As described above in the present device no springs are necessary to prevent chattering and proper sealing of the piston assemblies when the device is operating as a motor. A further function of the orifice 60 is to assure return movement of the sealing rings 58 toward the pistons 46 when the cylinders 37 are pressurized after the device has been freewheeling. During freewheeling when the drive shaft 11 is rotated without the delivery of fluid under pressure to the cylinders the seal rings 58 will be driven together toward the center of the cylinders and in this position they will remain until hydraulic fluid is again delivered to passages 40. When the delivery of hydraulic fluid under pressure is resumed it is of course desirable that the seal rings 58 be immediately returned to sealing engagement with the pistons 46 and that the pistons 46 return to rolling engagement with the cam tracks 53.

To achieve these objectives the orifice 60 is sufficiently small so that a net hydraulic force is applied to the seal ring 58 when separated from piston 46 in a direction toward the spherical piston 46, with this net hydraulic force being at least as great as the frictional force between the seal ring and the cylinder walls resisting such movement of the seal ring.

The pressure drop across the orifice 60 may be defined by the equation:

$$\Delta P = \frac{Q^2}{24.12 A_o^2}$$

where:
  $Q$ = flow through orifice 60, g.p.m., $$A_o^2 = \frac{\pi}{4} d_o^2$$

$d_o$ = diameter of orifice 60.

Now the piston ring frictional drag forces may be defined by $$F_f = 2\pi D b \mu P$$

where:
  $D$ = the cylinder diameter,
  $b$ = the width of piston rings 69
  $\mu$ = coefficient of friction between piston rings and cylinder wall, and
  $P$ = hydraulic pressure in cylinder.

In accordance with the limiting value of the restoring force ($F_r$) compared to the ring drag force ($F_f$) described above $F_r \geq F_f$, therefore $$\Delta P \times A_c = F_r = \left(\frac{\pi}{4} D^2\right) \times \left[\frac{Q^2}{(24.12)^2 \times \left(\frac{\pi}{4} d_o^2\right)}\right] \geq 2\pi D b \mu P$$

Reducing and rearranging for $d_o$ $$\frac{DQ^2}{358 d_o^4} \geq 2 b \mu P$$

$$d_o^4 \leq \frac{DQ^2}{716 b \mu P}$$

and thus we find that the diameter of orifice 60 should desirably be less than the following value $$d_o \leq \sqrt[4]{\frac{DQ^2}{716 b \mu P}}$$

The annular stepped valve member 36 is provided for conveying fluid between passages 15, 16 and the cylinder ports 43. The port face 39 on the cylinder block slidably engages valve surface 70 on valve member 36 during rotation of the cylinder block. Formed in annular array in the valve surface 70 about the axis of cylinder block 32 are a plurality of valve ports 82 corresponding in number to twice the number of lobes 54, so that if each cam has twelve lobes there would be twenty-four ports 82. Ports 82 are arranged so that alternate ones communicate with passage 15 and the remaining ones communicate with passage 16 so that there will be alternate high and low pressure ports 82. Toward this end valve member 36 has a first annular piston 84 defining in the stepped bore 38 an annular chamber 85 continuously communicating with alternate ones of ports 82 through axial annularly arrayed passages 86. Annular chamber 85 continuously communicates with port 15. A second smaller piston 89 is formed on the valve member 36 and defines a second annular chamber 90 continuously communicating with the remaining ports 82 through axial annularly arrayed passages 91. Chamber 90 continuously communicates with port 16 through radial passage 93.

The chambers 85 and 90 form fluid pressure chambers which serves as high or low pressure chambers depending upon the direction of flow of hydraulic fluid through the device, i.e. depending upon which of the passages 15 or 16 receives high pressure fluid to the motor 10. It should be understood that valve member 36, while prevented from rotation by radial pin 96 is permitted limited axial movement with the stepped bore 38. Fluid pressure acting in one of the chambers 85 or 90 urges the valve member 36 to the right so that proper sealing engagement is effected between valve surface 70 and the cylinder block port face 39.

For resisting any tendency of the cylinder block 32 to move away from the valve member 36 a hydrostatic thrust bearing 97 is provided. The thrust bearing 97 forms no part of the present invention and is disclosed and described in more detail in applicant's copending application Ser. No. 682,363 filed Nov. 13, 1967, to which reference should be made for a more complete description thereof. Means are also provided in thust plate 97a for communicating the interior of the motor housing, which collects leakage fluid, and the low pressure side of the hydraulic circuit permitting fluid within the housing to return to the circuit when the pressure of housing fluid exceeds the pressure in the low pressure side of the hydraulic circuit.

A plurality of ports or pockets 98 are provided in bearing face 99 of bearing 97 equal in number and aligned with respect to the ports 82.

Alternate ones of the ports 98 continuously communicate with each other through a first gallery arrangement including outwardly extending passages 101 continuously communicating with an annular passage 102 defined by a T-shaped separator member 104 seated within an annular recess 106 in the rear surface of bearing 97. The other alternate ports 98 continuously communicate with each other by a gallery arrangement comprising inwardly extending passages 107 and annular passage 109 also defined by the T-shaped member 104.

Since the thrust member 97 is held against rotation by a suitable pin 110 the ports 98 serially communicate with the passages 41 as the cylinder block 32 rotates. Fluid under pressure in balancing ports 98 passes between the surfaces 42 and 99 providing a fluid film defining a hydrostatic thrust bearing effect. It is apparent that each time one of the ports 98 communicates with a cylinder under pressure (or more particularly the passage 41 associated with a cylinder under pressure) the one of the annular chambers 102 or 109 communicating therewith provides pressurization of all the other alternate ports 98 communicating with that chamber to effectively balance the opposite hydrostatic effect resulting from simultaneous pressurization of the aligned alternate high pressure flow ports 82. The gallery arrangement including chambers 102 and 109 is necessary since all of the alternate ports 98 are not simultaneously in communication with the high pressure ones of the passages 41 so that they would not be simultaneously pressurized and could not hydrostatically balance the thrust effect produced by the alternate ports 82 which are simultaneously pressurized due to the chambers 85 and 90.

Annular rings 110 and 111, biased by resilient O rings, define check valves which open to permit hydraulic fluid in the casing to flow into the low pressure one of the chambers 102 or 109 which, as noted above, communicates with the low pressure side of the hydraulic circuit. Thus, the casing is effectively drained through one of the check valves in a manner so that leakage fluid returns to the hydraulic circuit. The check valves also prevent the escape of fluid from the high pressure one of the chambers 102 or 109.

While the operation of the hydraulic motor 10 is believed obvious from the above description, it will be described briefly for better understanding thereof. Assuming that high pressure fluid is ported to passage 15 from a suitable source, alternate valve ports 82 will be pressurized. The passages 41 communicating with the high pressure ones of ports 82 will convey hydraulic fluid to their associated cylinders and the pistons in these cylinders will be forced to part causing them to ride down the cam lobes 54 adjacent thereto producing rotation of the cylinder block 32. As these pistons pass the bottom of the cam lobes 54 (bottom dead center), and begin moving up the adjacent cam lobes inwardly relative to the cylinders 37 fluid is expelled from the cylinders. At this time the passages 41 associated with these pistons have serially moved out of communication with the high pressure ports and move serially into communication with the low pressure ports 82 so that fluid is expelled from these cylinders through passage 16. While the cams 49 and 52 have their lobes slightly out of phase the pistons 46 move toward and away from each other substantially simultaneously. It is apparent that for each revolution of the cylinder block 32 each piston will have a plurality of power cycles corresponding in number to the number of lobes 54 and that since there are two such pistons in each cylinder the present device has a very high displacement per revolution.

It should be understood that there is no significant pressure drop across orifice 60 so long as the seal rings 58 remain in sealing engagement with the spherical balls 46. However, there is still in this situation a net hydraulic force on the seal rings 58 holding them in engagement with the balls 46. This net force is caused by the differential areas exposed to hydraulic fluid pressure; and more particularly the smaller fluid area on the ball side of the seal ring 58 defined by the line contact 65 produces this net force urging the seal ring into engagement with the ball even though the pressure on each side of the orifice 60 is substantially equal. Of course, as described in detail above if any separation occurs between the seal ring and the spherical member, the net restoring force tending to urge the seal ring into engagement with the spherical ball is produced by the pressure drop across the orifice 60 since no differential areas exist under the separation condition.

What is claimed is:

1. A hydraulic fluid energy translating device comprising: a valve member having inlet and outlet ports therein, a cylinder block rotatable relative to said valve member having a plurality of cylinders therein serially communicable with said ports, springless piston means slidable in each of said cylinders, cam means for reciprocating said piston means in said cylinders, said piston means each including a generally spherical member slidable in said cylinders and adapted to be driven by said cam means, and a sealing ring sealingly engaging one side of each of said spherical members, said sealing rings engaging said spherical members at a sufficient diameter to expose enough of said spherical members to assure proper rolling contact thereof, said diameter being less than the diameter of the opposite side of said sealing ring exposed to fluid pressure in said cylinders, said sealing rings each having an orifice therein sized sufficiently small to produce a pressure drop across said sealing rings upon separation between the rings and the spherical members causing a force in excess of the drag forces on the sealing rings in a direction to return the sealing rings to the spherical members, minimizing unwanted noise caused by the piston means.

2. A hydraulic fluid energy translating device comprising: a valve member having inlet and outlet ports therein, a cylinder block rotatable relative to said valve member having a plurality of cylinders therein serially communicable with said ports, a springless piston assembly slidable in each of said cylinders, cam means for reciprocating said piston assemblies in said cylinders, said piston assemblies each including a generally spherical member adapted to be driven by said cam means, a sealing ring sealingly engaging each of said spherical members and the associated cylinder, sealing hydraulic fluid in said cylinders, said sealing rings engaging said spherical members at a sufficient diameter to expose enough of said spherical members to assure proper rolling contact thereof, said diameter being less than the diameter of the opposite side of said sealing ring exposed to fluid pressure in said cylinders, and means for maintaining engagement between the spherical members and the cam or between the sealing rings and the spherical member including means providing a pressure drop across said sealing rings upon separation between the rings and the spherical members producing a net force on said rings in excess of the drag forces thereon urging them toward said spherical members.

3. A hydraulic fluid motor as defined in claim 2 wherein said means providing a pressure drop across said sealing rings includes an orifice in each of said rings continuously communicating with hydraulic fluid in said cylinders, said sealing rings having sealing engagement with their associated spherical members which normally prevents the flow of fluid from the associated cylinders through said orifices.

4. A hydraulic fluid energy translating device comprising: a valve member having inlet and outlet ports therein, a cylinder block rotatable relative to said valve member having a plurality of cylinders therein serially communicable with said ports, a piston assembly slidable in each of said cylinders, cam means for reciprocating said piston assemblies in said cylinders, said piston assemblies each including a generally spherical member adapted to be driven by said cam means, a sealing ring sealingly engaging each of said spherical members and the associated cylinder, sealing hydraulic fluid in said cylinders, means for maintaining engagement between the spherical members and the cam or between the sealing rings and the spherical members including means providing a pressure drop across said sealing rings producing a net force on said rings urging them toward said spherical members, said means providing a pressure drop across said sealing rings including an orifice in each of said rings continuously communicating with hydraulic fluid in said cylinders, said sealing rings having sealing engagement with their associated spherical members which normally prevents the flow of fluid from the associated cylinders through said orifices and the diameter of the orifices being defined by the following equation:

$$d_0 \leq \sqrt[4]{\frac{DQ^2}{716b\mu P}}$$

where:
$d_0$ = diameter of sealing ring orifices,
D = diameter of the cylinders,
b = width of engagement of sealing rings with the cylinder walls,
$\mu$ = coefficient of friction between cylinder wall and sealing rings, and
P = hydraulic pressure in the cylinders.

5. A hydraulic fluid energy translating device comprising: a valve plate having inlet and outlet ports therein, cylinder block rotatable relative to said valve member and having a plurality of axially disposed cylinders therein serially communicable with said ports during said rotation, a springless piston assembly slidable in each of said cylinders, cam means for reciprocating said piston assemblies in said cylinders, said piston assemblies each including a ball member slidable in said cylinders and having rolling contact with said cam means, said spherical members being directly engageable with said cylinders, a sealing ring sealingly engaging one side of each of said spherical members, said sealing rings engaging said spherical members at a sufficient diameter to expose enough of said spherical members to assure proper rolling contact thereof, said diameter being less than the diameter of the opposite side of said sealing ring exposed to fluid pressure in said cylinders, seal means between each of said sealing rings and the associated cylinders, said sealing rings each having an orifice therethrough communicating with fluid in said cylinders and sized sufficiently small to produce a pressure drop across the sealing rings upon separation between the rings and the sealing members causing a force in excess of the drag forces on the sealing rings in a direction to maintain continuous engagement between the sealing rings and the spherical balls or between the spherical balls and the cam means without the need for any mechanical springs.

6. A hydraulic fluid energy translating device comprising: a valve member having inlet and outlet ports therein, cylinder block rotatable relative to said valve member and having a plurality of axially disposed cylinders therein serially communicable with said ports, two springless piston assemblies slidable in each of said cylinders, cylinder ports in said cylinder block communicating with said cylinders between said piston assemblies, cam means for reciprocating said piston assemblies in said cylinders, said piston assemblies each including a generally spherical member slidable in said cylinders and adapted to be driven by said cam means, a sealing ring sealingly engaging each of said spherical members, and projections on each of said sealing rings extending toward said cylinder ports adapted to serve as stops by engaging the opposing projections on the sealing rings in the opposed piston assemblies to thereby prevent the sealing rings from blocking said cylinder ports.

7. A hydraulic fluid energy translating device as defined in claim 6 wherein said spherical members directly engage said cylinders, and means for maintaining engagement between the sealing rings and the spherical members or between the spherical members and the cam means including an orifice in each of said sealing rings extending through said projections.

8. A hydraulic fluid energy translating device comprising: a valve member having inlet and outlet ports therein, cylinder block rotatable relative to said valve member and having a plurality of axially disposed cylinders therein serially communicable with said ports, two piston assemblies slidable in each of said cylinders, cylinder ports in said cylinder block communicating with said cylinders between said piston assemblies, cam means for reciprocating said piston assemblies in said cylinders, said piston assemblies each including a generally spherical member slidable in said cylinders and adapted to be driven by said cam means, a sealing ring sealingly engaging each of said spherical members, projections on each of said sealing rings extending toward said cylinder ports adapted to serve as stops by engaging the opposing projections on the sealing rings in the opposed piston assemblies to thereby prevent the sealing rings from blocking said cylinder ports, said spherical members directly engaging said cylinders, means for maintaining engagement between the sealing rings and the spherical members or between the spherical members and the cam means including an orifice in each of said sealing rings extending through said projections and the diameter of the orifice being defined by the equation:

$$d_o \leq \sqrt[4]{\frac{DQ^2}{716 b \mu P}}$$

where:
- $d_o$ = diameter of sealing ring orifices,
- $D$ = diameter of the cylinders,
- $Q$ = flow through the orifice,
- $b$ = width of engagement of sealing rings,
- $\mu$ = coefficient of friction between cylinder wall and sealing rings, and
- $P$ = hydraulic pressure in the cylinders.

References Cited

UNITED STATES PATENTS

| | | | |
|---|---|---|---|
| 2,617,360 | 11/1952 | Barker | 103—162 |
| 2,711,724 | 6/1955 | Jenny | 103—162 |
| 2,862,455 | 12/1958 | Ferris | 103—161 |
| 2,997,962 | 8/1961 | Wysong | 103—162 |
| 3,199,460 | 8/1965 | Bush et al. | 103—161 |

DONLEY J. STOCKING, *Primary Examiner.*

U.S. Cl. X.R.

313—84; 315—5.16, 5.27; 328—124